Oct. 6, 1953          B. W. HULFISH          2,654,405
JIGSAW HOLD-DOWN FOOT AND BLADE GUIDE
Filed April 17, 1947
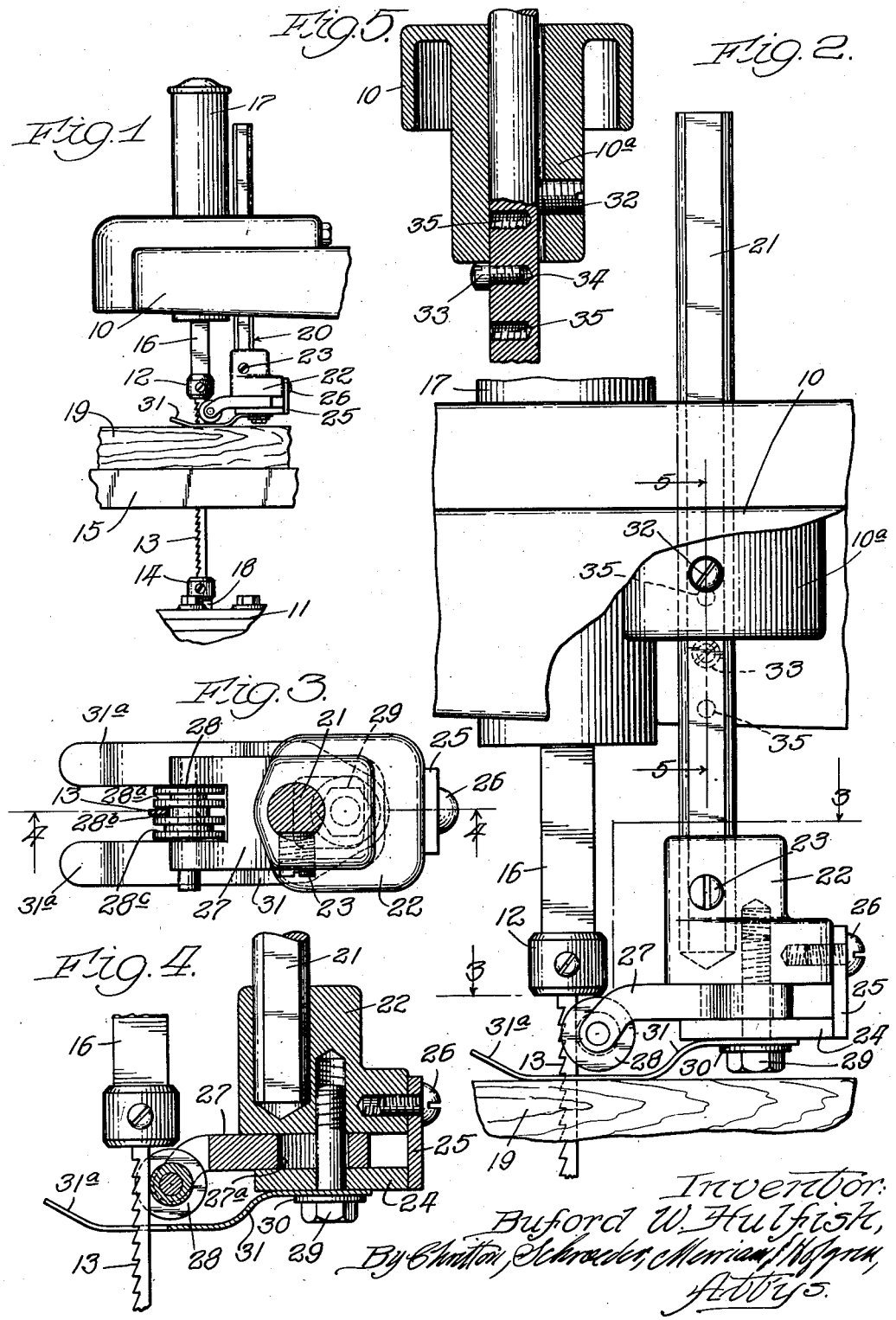

Patented Oct. 6, 1953

2,654,405

UNITED STATES PATENT OFFICE 2,654,405

JIGSAW HOLD-DOWN FOOT AND BLADE GUIDE

Buford W. Hulfish, Chicago, Ill., assignor to Birtman Electric Company, a corporation of Illinois Application April 17, 1947, Serial No. 741,973

4 Claims. (Cl. 143—162)

1

This invention relates to a holddown foot for a jig saw and the like.

Jig or scroll saws that employ a reciprocating saw blade extending through a work support table require a holddown foot adapted to bear against the work and hold it in place on the table and also bear against the back of the saw blade for support of the saw blade. I have invented an improved form of holddown foot wherein the members of the foot can be adjusted relative to each other and the foot itself can be adjusted relative to the work support table in order that the saw may be adapted for pieces of work having varying thicknesses. Means are provided for limiting the distance between the work contacting portion of the foot and the table to a predetermined maximum in order to prevent the foot from interfering with the upper support for the saw blade.

The invention will be described as related to the embodiment shown in the accompanying drawings. Of the drawings: Fig. 1 is a fragmentary elevation of a jig saw showing the new holddown foot which is the subject of this invention; Fig. 2 is an enlarged elevation similar to Fig. 1 with portions broken away for clarity of illustration; Fig. 3 is a section taken along line 3—3 of Fig. 2; Fig. 4 is an enlarged sectional elevation of the bottom portion of the holddown foot and an adjacent portion of the saw blade and upper mounting therefor; and Fig. 5 is a section taken along line 5—5 of Fig. 2.

The jig saw illustrated herein may be used for sawing relatively thin sheets of wood, plastic, fiberboard and the like. The saw comprises an upper arm 10, a base 11, an upper chuck 12 for supporting the upper end of the saw blade 13, a lower chuck 14 for supporting the lower end of the blade, a work support table 15 through which the saw blade 13 extends, a reciprocating member 16 to which the upper chuck 12 is attached, a housing 17 in which the reciprocating member 16 reciprocates, and a lower reciprocating member 18 to which the lower chuck 14 is attached. The work support table 15 is adapted to support the work such as the wooden plank 19 that is being sawed.

There is provided a holddown foot 20 mounted within the upper arm 10 and located so as to be adjacent the reciprocating member 16 and the saw blade 13. The foot comprises a bar 21 extending through the upper arm 10 and arranged substantially parallel to the saw blade 13 and a support member 22 attached to the lower end of the bar 21 as by screw 23. The bottom of the

2 support member is provided with a base plate 24 adapted to be held in abutting relationship with a side plate 25 which in turn is held in place by a screw 26. The bottom of the support member 22, the plate 25, and the base plate 24 provides a substantially U-shaped structure having the open portion of the U extending toward the saw blade. Mounted within this U there is located a wheel supporting member 27 having a wheel 28 on its free end adapted to bear against the back of the saw blade 13. This wheel supporting member 27 is provided with a substantially square slot 27a having rounded corners and the member is clamped in place by a bolt 29 extending between the base plate 24 and the support member 22. This one bolt serves to hold the base plate 24, the member 27 and a spring member 31. The wheel supporting member 27 may be adjusted to the proper position so that the wheel 28 bears against the saw blade 13 and the member may be clamped in this position by tightening the bolt 29. The slot 27a is wider than the bolt 29 so that the member 27 may be adjusted laterally as well as longitudinally. The head of the bolt bears against a washer 30 which in turn bears against a spring member 31 having a bifurcated end 31a adapted to straddle the saw blade 13 and bear against the work 19. The spring 31 may be fastened to the base plate 24 if desired. This spring is not adjusted when the supporting member 27 is adjusted as the spring has a round hole which closely fits the bolt 29.

The bar 21 may be moved up or down to regulate the distance between the spring 31 and the top of the work support table 15 to a distance equal to the thickness of the work 19. The bar 21 is held in place within the housing by means of a screw 32 and may be adjusted by loosening the screw. In order to prevent the bar 21 from being raised to such a height that the wheel 28 will be struck by the upper chuck 12 when the saw blade is being moved downwardly, there is provided a screw 33 engaging a threaded hole 34 in the bar 21. The screw 33 will abut against a downwardly extending portion 10a of the upper arm 10 when the bar is moved its maximum upward distance, as shown in Fig. 5. The screw 33 may be located at various points along the bar 21 by providing additional threaded holes 35. Thus the maximum distance of movement may be varied to accommodate saw blades of varying lengths.

The screw 32 which holds the bar 21 in position is shown as being an ordinary headless screw.

If desired, however, it may be made longer and provided with a handle for easier manipulation.

The wheel 28 is provided with a plurality of grooves such as the three shown, 28a, 28b, and 28c. These grooves, as shown, are of varying widths and depths so as to accommodate saw blades of different dimensions.

An important feature of the hold down foot is that tightening of the bolt 29 will not tend to turn the wheel supporting member 27 and therefore will not disturb the desired position of the guide wheel 28. Torque set up by turning the bolt 29 will be transmitted from the bolt head by friction to the washer 30 and base plate 24. Since the end edge of the base plate 24 is against the side plate 25 the torque will be absorbed by this side plate so that no torque is exerted on the supporting member 27.

Another important feature of the invention is that one bolt 29 loosens the supporting member 27, and thus the wheel 28, for all adjustments in a horizontal plane, and this same bolt maintains the supporting member 27 and wheel 28 in their adjusted position.

Having described my invention as related to the embodiment shown in the accompanying drawings, it is my intention that the invention be not limited by any of the details of the description unless otherwise specified, but rather be construed broadly within its spirit and scope as set out in the accompanying claims.

I claim:

1. A holddown foot for a saw having a longitudinally movable saw blade therein, an upper arm for holding the upper end of the saw blade, and a work support table through which the blade extends, said foot comprising a rod member adapted to extend through said upper arm and be held adjacent the saw blade, a generally U-shaped support portion having a base and separate legs abutting the base and fastened to the bottom end of the bar member with the open end of the U extending toward the saw blade, one leg of said U-shaped member being movable bodily with relation to the other leg, a saw blade bearing member adapted to be slidably held within the U with one end bearing against the back of the saw blade, means for clamping the legs of the U toward each other to hold the bearing member in a desired position, and a spring member held in place by said clamping member and adapted to bear against the work and hold it against the table.

2. A supporting guide for a saw having a longitudinally movable saw blade therein, said foot comprising: a generally U-shaped body portion adapted to be held in a plurality of positions adjacent the saw blade with the open end of the U extending toward the saw blade, said U-shaped body portion comprising a top portion, an end plate fastened to the top portion, and a base plate abutting against the end plate so that torque exerted on the base plate will be dissipated through the end plate; a wheel supporting member adapted to be slidably held in the U and having an opening therein; a wheel on said supporting member adapted to bear against the back of the saw; and a bolt extending through the U-shaped body portion and through said opening for holding said base plate against the wheel supporting member and locking it in place.

3. The supporting guide of claim 2 wherein said opening is a slot having a greater width and length than the diameter of said bolt.

4. A hold-down foot for a saw having a longitudinally movable saw blade therein, said foot comprising: a generally U-shaped body portion adapted to be held in a plurality of positions adjacent the saw blade with the open end of the U extending toward the saw blade, said U-shaped body portion comprising a top portion, an end plate fastened to the top portion, and a base plate abutting against the end plate; a wheel supporting member adapted to be slidably held in the U and having an opening therein; a wheel on said supporting member adapted to bear against the back of the saw; a bolt extending through the U-shaped body portion and through said opening for holding said base plate against the wheel supporting member and locking it in place; and a spring member also held by said bolt for bearing against the work being sawed with the spring member having a hole therein closely embracing said bolt.

BUFORD W. HULFISH.

References Cited in the file of this patent

UNITED STATES PATENTS

| Number | Name | Date |
|---|---|---|
| 210,403 | Casson | Dec. 3, 1878 |
| 378,896 | Mooney | Mar. 6, 1888 |
| 2,191,410 | Ocenasek | Feb. 20, 1940 |